United States Patent [19]

Inoue et al.

[11] Patent Number: 5,343,339
[45] Date of Patent: Aug. 30, 1994

[54] TAPE LOADING DEVICE WITH SELECTIVE TAPE LOADING CHARACTERISTIC FOR MAGNETIC RECORDING/REPRODUCING APPARATUS

[75] Inventors: Atsushi Inoue, Chigasaki; Nobuyuki Kaku, Kanagawa; Takashi Sasaki, Yokohama; Yasuyuki Niguchi; Yasuo Inagaki, both of Katsuta, all of Japan

[73] Assignee: Hitachi, Ltd., Tokyo, Japan

[21] Appl. No.: 972,836

[22] Filed: Nov. 6, 1992

[30] Foreign Application Priority Data

Nov. 8, 1991 [JP] Japan .................................. 3-319617

[51] Int. Cl.⁵ .............................................. G11B 15/18
[52] U.S. Cl. .................................... 360/71; 242/334.4; 242/340; 360/69
[58] Field of Search ............. 360/69, 71, 73.01, 73.04, 360/73.09, 73.14, 74.1, 74.2, 74.3; 242/186, 189, 191, 75.5, 75.51, 201

[56] References Cited

U.S. PATENT DOCUMENTS

| | | | |
|---|---|---|---|
| 4,341,363 | 7/1982 | Inatome | 242/189 |
| 4,536,806 | 8/1985 | Louth | 360/69 |
| 4,631,605 | 12/1986 | O'Gwynn | 360/70 |
| 4,649,441 | 3/1987 | Louth | 360/71 |
| 5,222,684 | 6/1993 | Yoneda et al. | 242/186 |

FOREIGN PATENT DOCUMENTS

2282968 11/1990 Japan .

*Primary Examiner*—Andrew L. Sniezek
*Attorney, Agent, or Firm*—Antonelli, Terry, Stout & Kraus

[57] ABSTRACT

A tape loading device is for a cassette type magnetic recording/reproducing apparatus in which a tape is drawn out of a cassette for record or reproduction, and includes movable tape guides for defining a path for running of the tape, a pair of reel driving motors which independently drive two reels of the cassette to apply a back-tension to the tape, and a control unit. The reel driving motors are activated to apply the same torque to both the reels, before the tape loading operation. In this state, a tape wind diameter ratio and/or an inertia ratio between the reels is computed based on the speeds and directions of rotations of the reels. The control unit selects a control pattern which would effectively suppress rotations of the reels due to inertia, out of a plurality of control patterns, in accordance with the computed value. In tape loading or unloading operation, the control unit controls operation of the movable tape guides and/or the reel driving motors in accordance with the selected pattern. Thus, any undesirable effect of inertia of the cassette reels is avoided, so that tape is loaded or unloaded in a short time without suffering from damage.

9 Claims, 11 Drawing Sheets

TAPE LOADING DEVICE WITH SELECTIVE TAPE LOADING CHARACTERISTIC FOR MAGNETIC RECORDING/REPRODUCING APPARATUS

BACKGROUND OF THE INVENTION

The present invention relates to a tape loading device for a magnetic recording/reproducing apparatus such as a VTR (video tape recorder) or a DAT (Digital Audio Tape Recorder) and, more particularly, to a tape loading device which is used for a magnetic recording-/reproducing apparatus of a type wherein a tape is drawn or pulled out of a cassette and then loaded.

A VTR device, as a typical example of the magnetic recording and reproducing apparatus of the type mentioned above, has a tape loading device in which tape guides each having flanges at both ends thereof, as well as inclined tape guides, are provided and the flanged and inclined tape guides define a path along which the tape runs. Some of these tape guides are installed on a movable bases to protrude therefrom. After a tape cassette has been loaded on a VTR, as the movable bases move along a guide plate disposed around a rotary head drum, the tape guides on the movable bases draw the tape out of the tape cassette and wind the same on the peripheral surface of the rotary head drum. This type of tape loading device is disclosed, for example, in Japanese Unexamined Patent Publication No. 2-282968.

In recent years, in the field of magnetic recording and reproducing apparatus, there are increasing demands for higher performance such as a greater speed of tape loading and unloading, higher access speed and other factors, particularly for VTRs used in broadcasting and other business purposes. On the other hand, there is a trend toward reduction in the thickness and stiffness of magnetic tapes, in order to meet requirements for digital signal recording/reproduction and for longer playing time, increasing the risk for the tape to be damaged. This tendency noticeably affects high-speed tape loading operation.

For instance, the known apparatuses encounter the following problems. When a high-speed tape loading is conducted, the tape is excessively drawn out due to inertia of reels of the cassette even after the mechanism such as tape guides is stopped upon completion of the operation. As a result, the tape is slackened on the peripheral surface of the rotary head drum or on the tape guides, or the tape comes off the drum, resulting in damaging of the tape.

SUMMARY OF THE INVENTION

The invention has an object of providing a tape loading device for a magnetic recording/reproducing apparatus, which is capable of performing high-speed tape loading and unloading without being accompanied by the troubles or problems as described hereinabove.

Another object of the present invention is to provide a tape loading device which can properly handle even the magnetic tape of a small thickness, thus contributing to improvement in the performance of a magnetic recording and reproducing apparatus.

Some of the present inventors have proposed, in U.S. patent application Ser. No. 07/683875, now U.S. Pat. No. 5,307,215, a tape loading device in which reel motors and a loading motor are controlled to cause a stepped change in the tape tension in relation to the progress of the tape loading process or in accordance with the time elapsed. Further, proposed in U.S. patent application Ser. No. 07/893072 pending is a tape loading device in which reel motors or a loading motor is controlled in accordance with the phase of loading operation and the values of inertia of reels which are computed on the basis of the speeds and direction of rotation of the reels and the phase of the tape loading operation.

The invention aims at further improving these proposed tape loading devices in order to achieve the above-described objects. More specifically, the improvement resides in that the tape loading and unloading operations are controlled under controlling conditions for effectively suppressing the rotations of both cassette reels due to inertia, which controlling conditions are selected in accordance with the tape winding ratio and/or the inertia ratio between cassette reels computed on the basis of the speeds and direction of rotation of these reels as measured while these reels are under the same level of torque.

According to one aspect of the invention, a tape loading device comprises a tape guide mechanism for drawing a tape out of a tape cassette and defining a path for run of the tape, a driving source for driving two reels of the cassette, respectively, to apply a back tension to the tape, a detector/computer for detecting directions and speeds of rotations of the reels and computing at least one of a tape winding diameter ratio and an inertia ratio between the reels, and a controller for activating the tape guide mechanism and the reel driving source.

With the above construction, when the loading or unloading operation of a tape, the tape winding diameter ratio or the inertia ratio between two cassette reels is computed by the detecting/computing unit and the result of the computation is sent to the control unit which sets, in accordance with the computation result, tape loading or unloading conditions which would effectively suppress rotations of the reels due to inertia. The control unit then controls the tape guiding mechanism and/or the reel drive power source under the set conditions. Consequently, any rotation of the reels is suppressed to thereby take the tape under protection, thus enabling quick loading or unloading of the tape.

It is preferable to provide the tape loading device, in addition to the above construction, with a detector for detecting the phase of operation of the tape guide mechanism and transferring the same to the control unit. When such a detector is used, the operational position of the tape guide mechanism is momentarily detected so that the control unit controls the tape loading or unloading operation while monitoring the operational position information.

BRIEF DESCRIPTION OF THE DRAWINGS

The above and other objects, features and advantages of the invention will become clear from the description which will be made hereinunder with reference to the accompanying drawings, wherein.

DESCRIPTION OF THE PREFERRED EMBODIMENTS

The invention will be described in more detail on the basis of preferred embodiments shown in the drawings.

Figure 2:
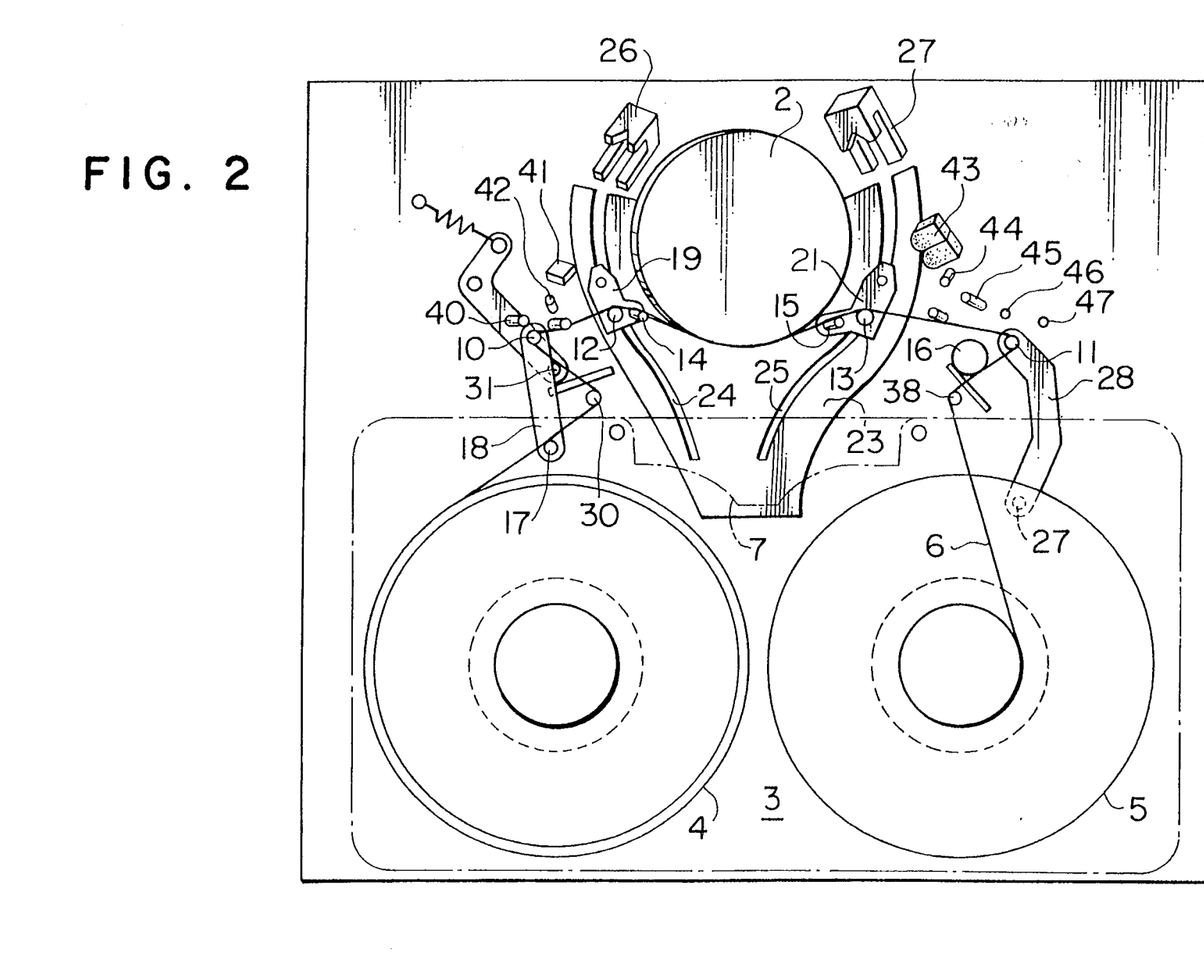
FIG. 2 is a schematic illustration showing a mechanical part of the device of the first embodiment in the course of a tape loading operation.
Figure 3:
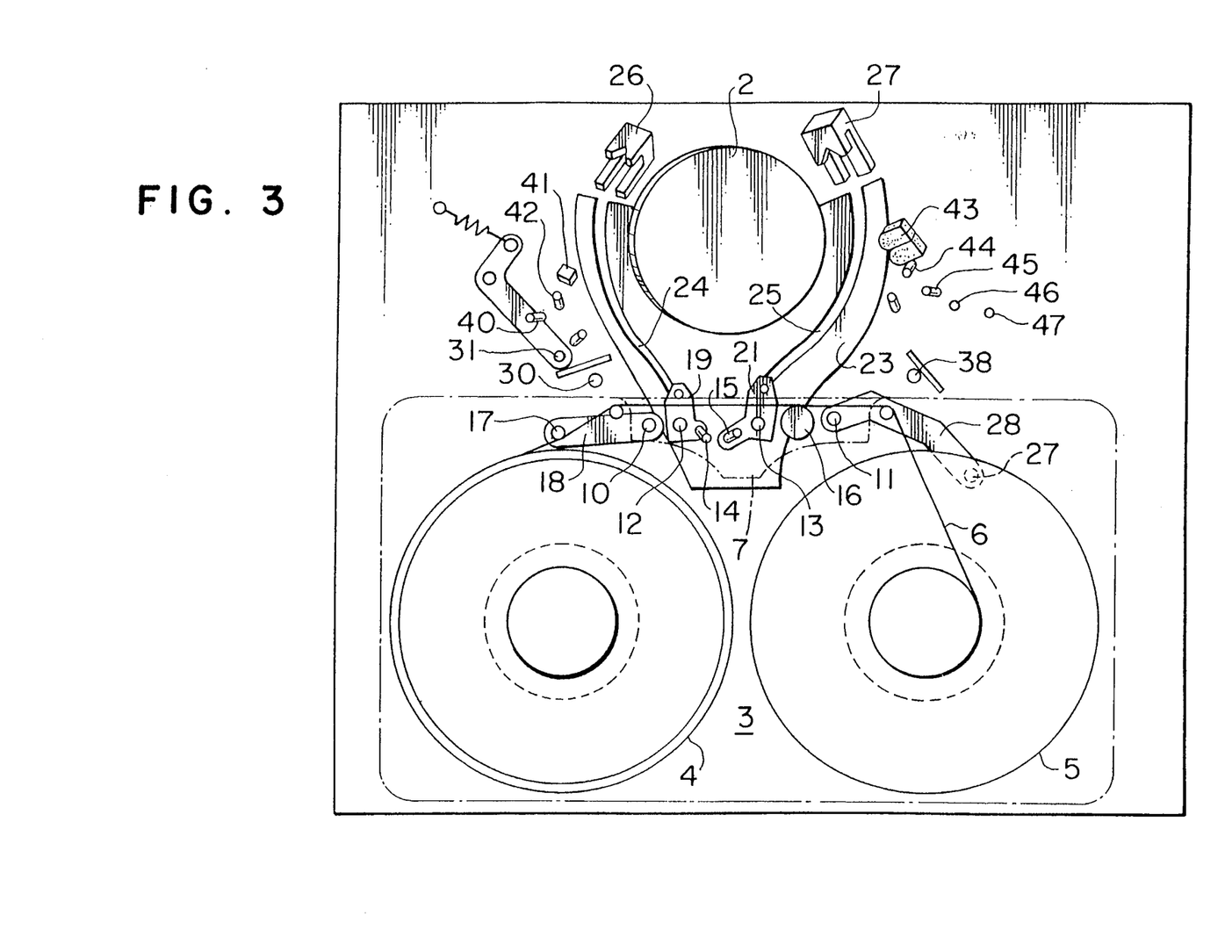
FIG. 3 is a schematic illustration showing the mechanical part of FIG. 2 in a state before the tape loading operation.
Figure 4:
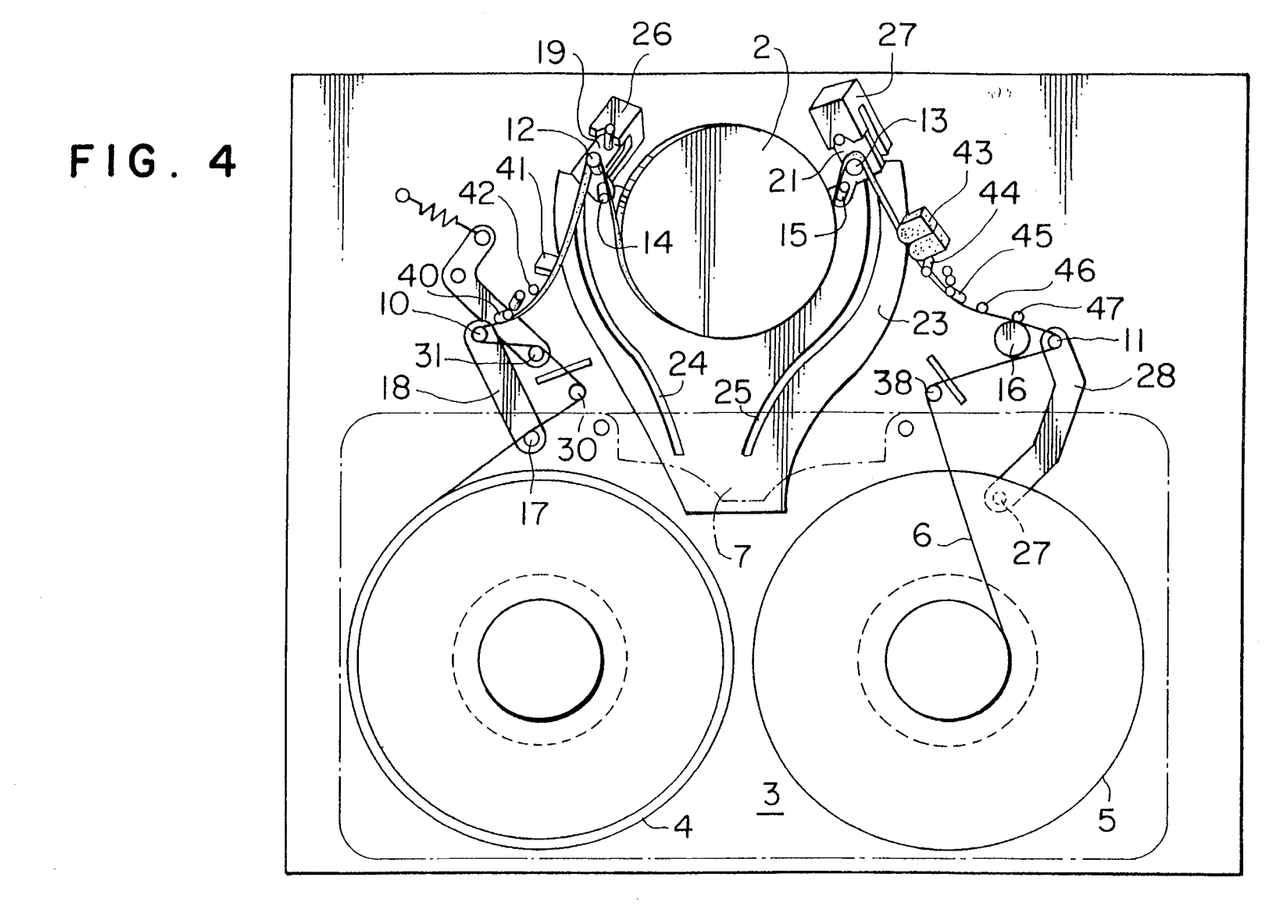
FIG. 4 is a schematic illustration showing the mechanical part of FIG. 2 in a state after completion of the tape loading operation.

FIGS. 2, 3 and 4 are plan views schematically showing the mechanical part of the tape loading device according to the first embodiment of the invention. FIG. 2 shows the mechanical part in its state of being in the course of a tape loading operation, while FIGS. 3 and 4 illustrate the mechanical part in the state before the commencement of the tape loading operation and in a state after completion of the tape loading operation, respectively. Referring to these Figures, a VTR has a rotary head drum 2 which is rotatably mounted on a chassis of the VTR and carries magnetic heads for recording and reproduction. A cassette 3 has cassette reels 4 and 5 mounted therein and accommodates a tape 6 wound on and extended between these reels 4, 5. An opening 7 is formed in the front wall of the cassette 3. In the state before the tape loading operation, the tape 6 is stretched along the opening 7, as shown in FIG. 3.

The arrangement is such that, when the cassette 3 is loaded on the VTR, various tape guide members are inserted into the opening 7. These tape guide members are a supply-side drawing guide 10, a tape guide 12 and an inclined tape guide 14 which are mounted on a supply side movable base 19, an inclined tape guide 15 and a tape guide 13 which are mounted on the movable base 21 of the take-up side, a pinch roller 16 and a take-up side drawing guide 11. The movable bases 19 and 21 are adapted to be driven by a later-mentioned loading motor 106 so as to move along guide grooves 24, 25 which are provided in a guide plate 23. The guide plate 23 has a bifurcated shape surrounding the rotary head drum 2. One of two legs of the bifurcated guide plate 23 has the guide groove 24, while the guide groove 25 is formed in the other leg. When the tape loading operation is completed, holding members 26, 27 disposed on both sides of the rotary head drum 2 in the close proximity therewith, locate and hold the movable bases 19, 21, respectively, thus enabling the tape 6 to be wound around the rotary head drum 2.

The drawing guide 10 of the tape supply side is driven by the loading motor 106 similarly to the driving of the movable bases 19, 21. When the tape loading operation is completed, the guide 10 is located at the position illustrated in FIG. 4, thus forming a supply-side tape path along which the tape being supplied runs. More specifically, the tape 6, while being drawn or pulled by the supply side drawing guide 10, is wound around a supply side tape guide 30 and a tension pin 31 for detecting tape tension.

The tape 6 further runs from the supply side drawing guide 10 in contact with an inclined tape guide 40, a tape guide 42 and then with a full-width eraser head 41 and is wound around the rotary head drum 2 through the tape guide 12 and inclined tape guide 14 on the movable base 19.

Similarly, the take-up side drawing guide 11 is driven by the loading motor 106 so as to be located at a position shown in FIG. 4, thus forming a take-up side tape path along which the tape being taken up runs. More specifically, the tape 6 runs from the rotary head drum 2 into contact with an A/C (Audio/Control) head 43 through the inclined tape guide 15 and the tape guide 13 on the take-up side movable base 21. The tape 6 then runs around a tape guide 44, an inclined tape guide 45 and a tape guide 46, so as to return into the cassette through a capstan 47, a take-up side drawing guide 11 and the tape guide 38.

As shown in FIG. 4, the tape running path obtained after the completion of the tape loading operation is formed three-dimensionally by means of four inclined tape guides 40, 14, 15 and 45 so as to enable the tape to properly slant and contact the rotary head drum 2. In this state, the capstan 47 cooperates with the pinch roller 16 to nip the tape 6, and is driven by the power of a capstan motor (not shown) so as to forward the tape 6. The tape loading device of this embodiment further has reel motors 104, 105 (see FIG. 1) which respectively drive the reels 4, 5 in the cassette 3 under controlled driving conditions.

Figure 5:
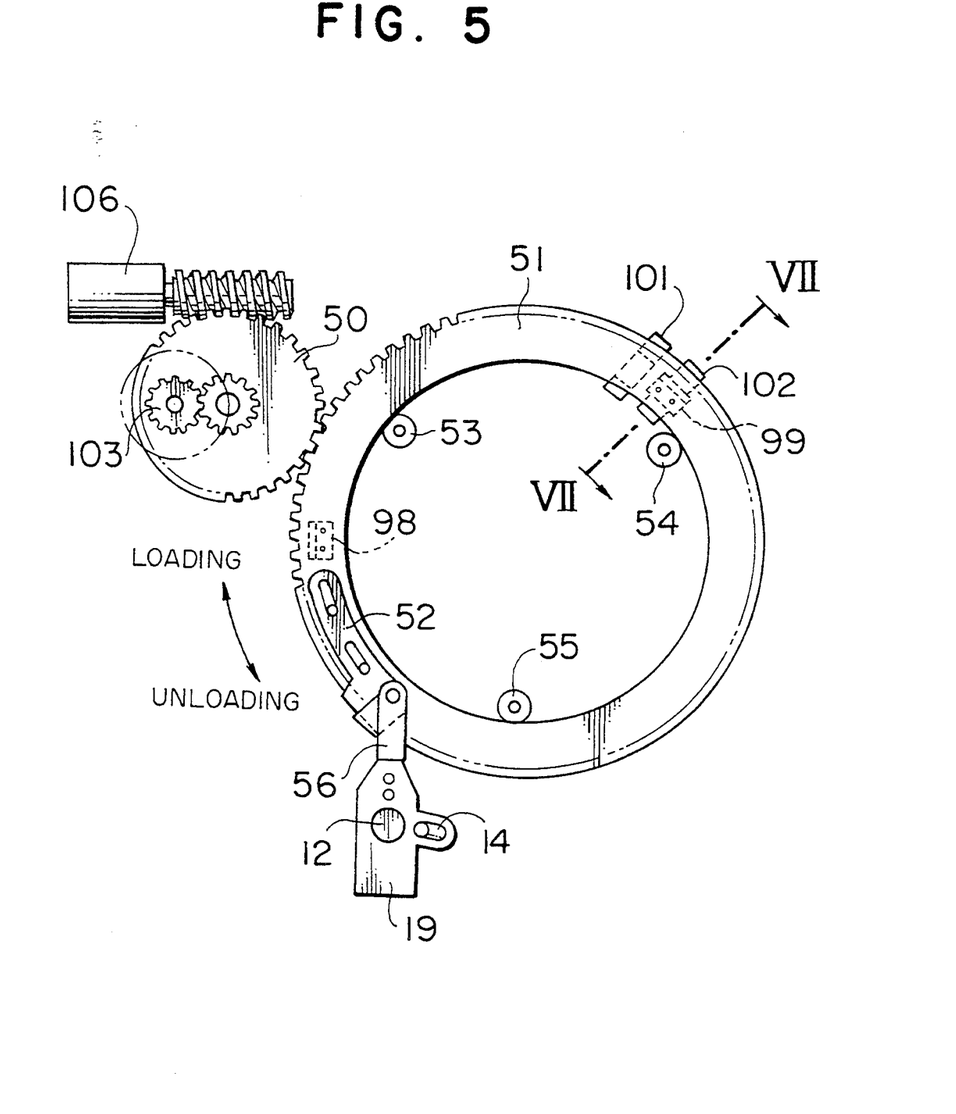
FIG. 5 is a schematic illustration for explanation of a mechanism for driving a tape supply side movable base in the tape loading device of FIG. 2.
Figure 6:
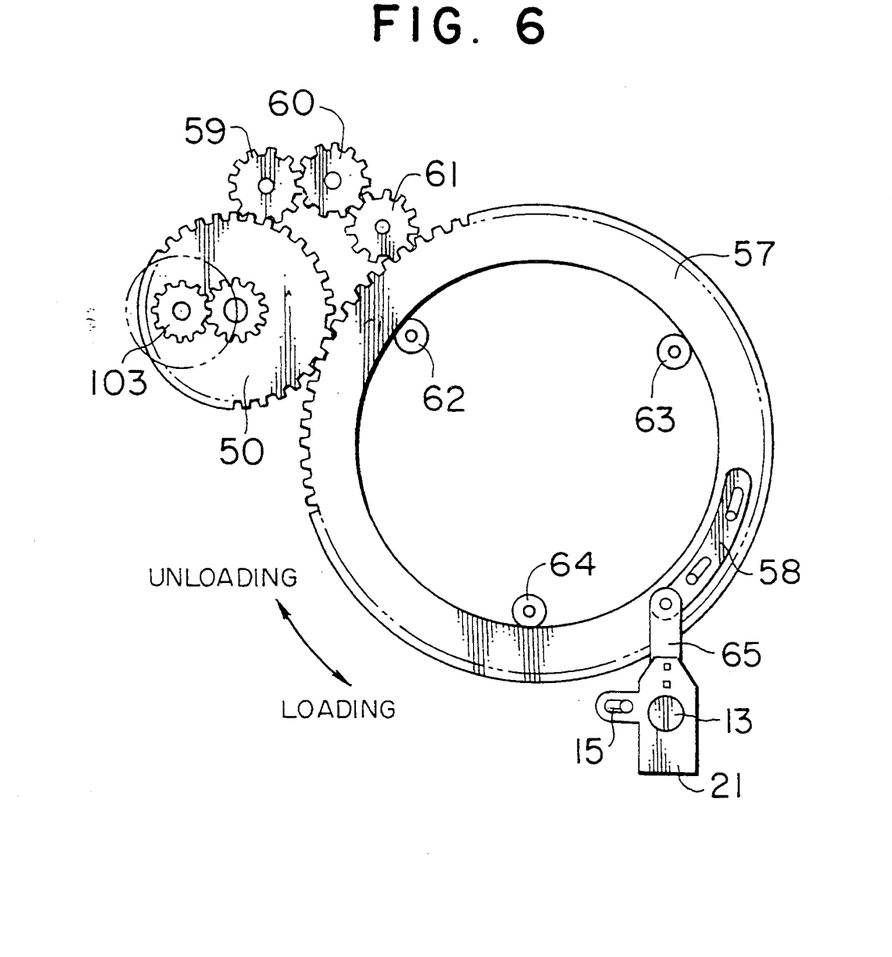
FIG. 6 is a schematic illustration for explanation of a mechanism for driving a tape take-up side movable base in the tape loading device of FIG. 2.

Tape loading and unloading operations are performed by mechanisms which will be described hereinafter with reference to FIGS. 5 to 9. FIG. 5 illustrates a driving mechanism for the supply side movable base, while FIG. 6 shows a driving mechanism for the take-up side movable base. As will be seen from FIG. 5, the output torque of the loading motor 106 is transmitted through a cam gear 50 to a supply side loading ring 51 to which is secured a slide plate 52. The slide plate 52 is coupled to the aforesaid supply side movable base 19 via a connecting plate 56. The slide plate 52 is normally urged in a predetermined direction by a spring which is not shown. Therefore, as the loading ring 51 continues to rotate a certain angle against the spring force even after the movable base 19 has been moved along the guide plate 23 and then located, the movable base 19 is urged to and surely located at a predetermined position by the spring force.

Referring now to FIG. 6, a slide plate 58 is attached to a take-up side loading ring 57 to which the torque of the loading motor 106 is transmitted via the cam gear 50 and a power transmission gear train including gears 59, 60 and 61. The slide plate 58 is connected to the take-up side movable base 21 through a connector plate 65. The slider plate 58 is normally urged in a predetermined direction by a spring which is not shown. Therefore, as the loading ring 57 continues to rotate a certain angle against the spring force even after the movable base 21 has been moved along the guide plate 23 and then located, the movable base 21 is urged to and surely located at a predetermined position by the spring force.

As will be seen from FIGS. 5 and 6, the supply side loading ring 51 and the take-up side loading ring 57 are arranged concentrically around the rotary head drum 2 and are respectively supported by support members 53, 54, 55 and 62, 63, 64, but are disposed at different horizontal levels so as not to interfere with each other. Both the loading rings 51 and 57 are driven through the con, non cam gear 50 by the loading motor 106, so as to rotate about the supporting members 53, 54, 55 and 62, 63, 64, respectively. The take-up side loading ring 57, however, rotates in the direction opposite to the direction of rotation of the supply side loading ring 51, because the ring 57 is driven via the gear train 59, 60, 61. Numeral 103 designates a potentiometer which detects the tape loading operation position (or tape unloading operation position). The potentiometer 103 has a rotor which rotates in synchronization with the cam gear 50.

As shown in FIG. 5, sensors 101, 102 for sensing the tape loading completion position and the tape unloading completion position, respectively, are disposed beneath the supply side loading ring 51. These sensors 101 and 102 are adapted to sense completion of the tape loading operation and the tape unloading operation, respectively, as these sensors are interrupted by shutters 98 and 99 which are secured to the reverse side of the supply side loading ring 51.

Figure 7:
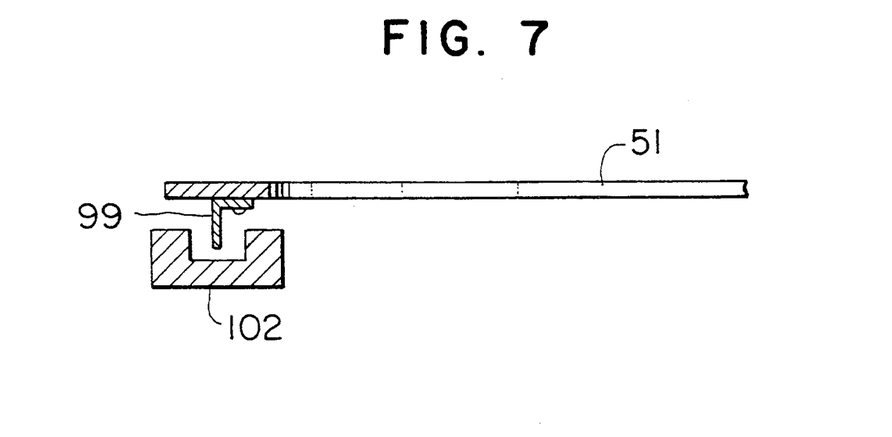
FIG. 7 is a sectional view taken along the line VII—VII of FIG. 5.

Shown in FIG. 7 is the state of the sensor 102 for detecting completion of the tape unloading operation when the tape unloading operation has been completed, wherein the sensor is interrupted by the shutter 99.

Figure 8:
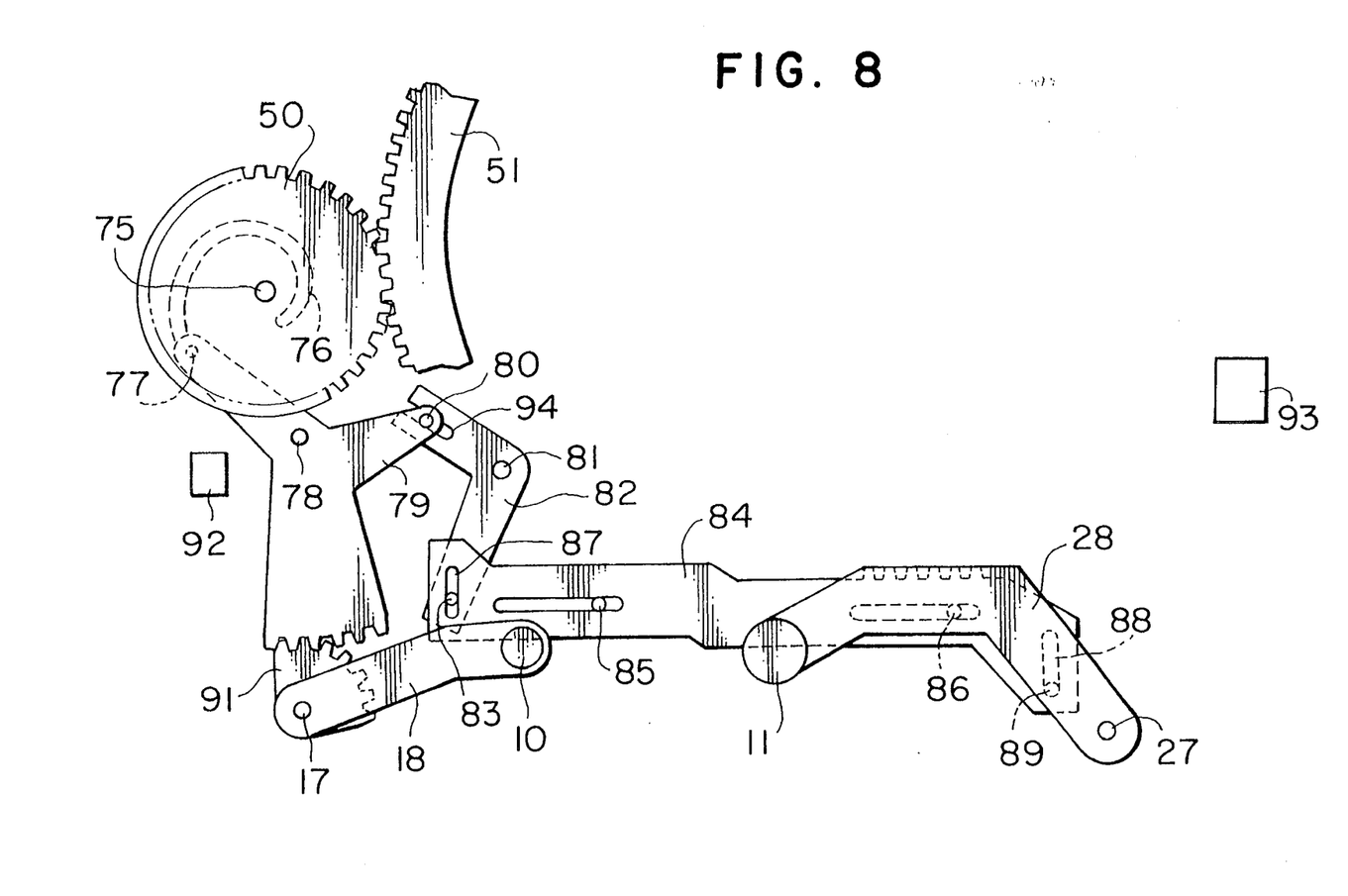
FIG. 8 is a schematic illustration showing a driving mechanism for tape drawing guides on the tape supply and take-up sides of the device of the first embodiment, in a state before the tape loading operation.
Figure 9:
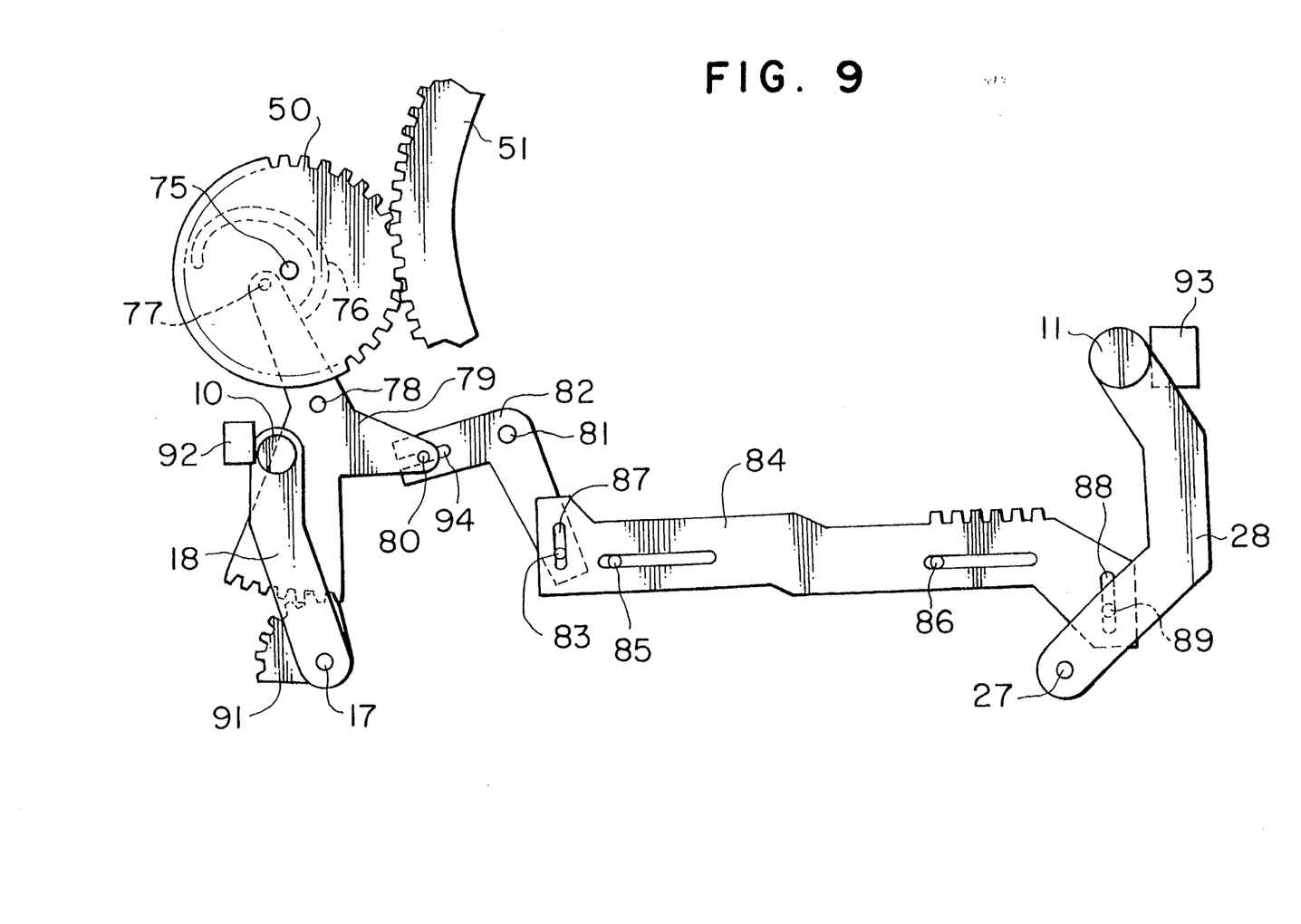
FIG. 9 is a schematic illustration showing the driving mechanism of FIG. 8 in a state after completion of the tape loading operation.

FIGS. 8 and 9 show a driving mechanism for the supply side drawing guide 10 and the take-up side drawing guide 11, in its states before the loading of the tape and after completion of the tape loading, respectively. The operations of the drawing guides 10 and 11 on the supply and take-up sides are as follows. When the loading motor 106 operates in the tape loading direction, the driving torque of the motor 106 is transmitted to the cam gear 50 so that the cam gear 50 rotates in the tape loading direction (counterclockwise as viewed in FIG. 8) about a support shaft 75. As a result, a trifurcated drive arm 79, which has a follower projection 77 engaging with a cam groove 76 formed in the underside of the cam gear 50, is rotated clockwise as viewed in FIG. 8 about a support shaft 78 in accordance with the movement of the cam groove 76. Consequently, a sector gear 91, which engages with a sector gear portion formed on one end of a driving arm 79, is rotated counterclockwise as viewed in FIG. 8. The sector gear 91 is supported by a support shaft 17 which also supports the drawing arm 18 having at its one end the supply side drawing guide 10, so that the sector gear 91 and the drawing arm 18 rotates as a unit with each other. Therefore, the supply side drawing guide 10 on the drawing arm 18 also is rotated in the same direction as the rotation of the sector gear 91, thereby extracting the tape 6.

A pin 80 is provided on the other end of the above-mentioned driving arm 79. This pin 80 engages with a bifurcated groove 94 formed in one end of an L-shaped connecting arm 82 which rotates about a supporting shaft 81. The clockwise rotation of the driving arm 79 described above, as viewed in FIG. 8, causes the connecting arm 82 to rotate counterclockwise. A pin-slit engagement is made between a pin 83 provided on the other end of the connecting arm 82 and an elongated groove 87 formed in one end of the slider 84. The slider 84 has a pair of limiting grooves which extend in the same direction and which engage with fixed pins 85, 86, respectively. The slider 84, because of such engagements, is slidable in a horizontal direction as viewed in FIG. 8. More specifically, the slider 84 slides, to the right as viewed in FIG. 8 in response to the above-mentioned counterclockwise rotation of the connecting arm 82. The drawing arm 28, which is rotatable on the support shaft 27, carries a pin 89 which engages with an elongated groove 88 formed in the other end of the slider 84. The rightward slide motion of the slider 84 causes a clockwise rotation of the drawing arm 28 as viewed in FIG. 8 so that the take-up side drawing guide 11 on the drawing arm 28 is moved correspondingly so as to draw or pull the tape 6.

In FIGS. 8 and 9, numerals 92 and 93 denote stoppers for regulating the positions of the supply side guide 10 and the take-up side guide 11 at the end of the tape loading operation, respectively. It will be clear that, in the described mechanism in FIGS. 8 and 9, the tape unloading operation is executed in a sequence reverse to that of the tape loading operation.

As have described above, the tape loading and unloading operations are performed by the power which is derived from the sole driving source, i.e., the loading motor 106, via the cam gear 50. The rotational phase of the cam gear 50 and an output from the aforesaid potentiometer 103 exactly correspond to each other as the potentiometer (phase detector) is rotated synchronously with the cam gear 50. It is therefore possible to know the phase or the state of progress of the tape loading or unloading operation by sensing the output of the potentiometer 103.

Figure 1:
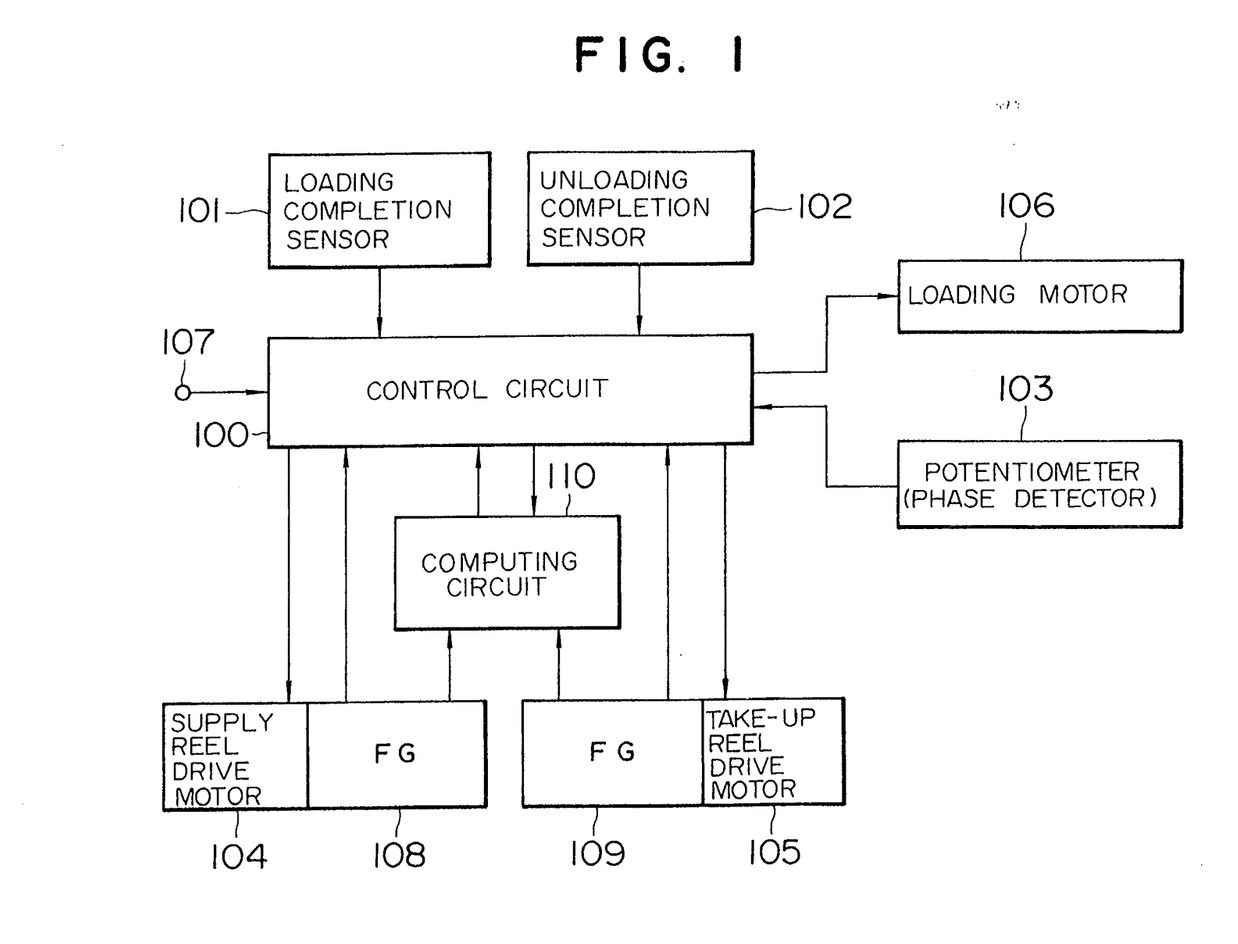
FIG. 1 is a block diagram illustrative of the control system employed in the tape loading device for a magnetic recording/reproducing apparatus according to a first embodiment of the invention.

FIG. 1 shows a control system for controlling the operation of the above-described mechanism in the first embodiment. In FIG. 1, reference numeral 100 denotes a control circuit for controlling the operation of the whole tape loading device. The control circuit 100 receives various output signals such as those from the loading completion sensor 101, unloading completion sensor 102, the potentiometer 103, and FG output signals from frequency generators 108, 109 (see FIG. 1) which are provided on the supply side and take-up side reel driving motors 104, 105. The signals from the frequency generators 108, 109 are indicative of the directions and speeds of rotations of the respective reel driving motors. The control circuit 100 also receives the results of computation from a tape winding diameter computing circuit 110 which is provided to perform a predetermined computation based on the output data from the frequency generators 108 and 109. The output signal from the potentiometer 103 is reset to zero in response to a tape unloading completion signal from the sensor 102 at the beginning of the tape loading operation, and is progressively incremented in accordance with the progress of the tape loading operation. Conversely, when the tape unloading operation is executed, the output signal from the potentiometer 103 is reset to zero in response to a tape loading completion signal from the sensor 101, and is counted in the control circuit 100 so as to be incremented progressively in accordance with the progress of the tape loading operation. In FIG. 1, numeral 107 designates an input terminal through which, for instance, operation con, hands given by an operator are entered.

Figure 10:
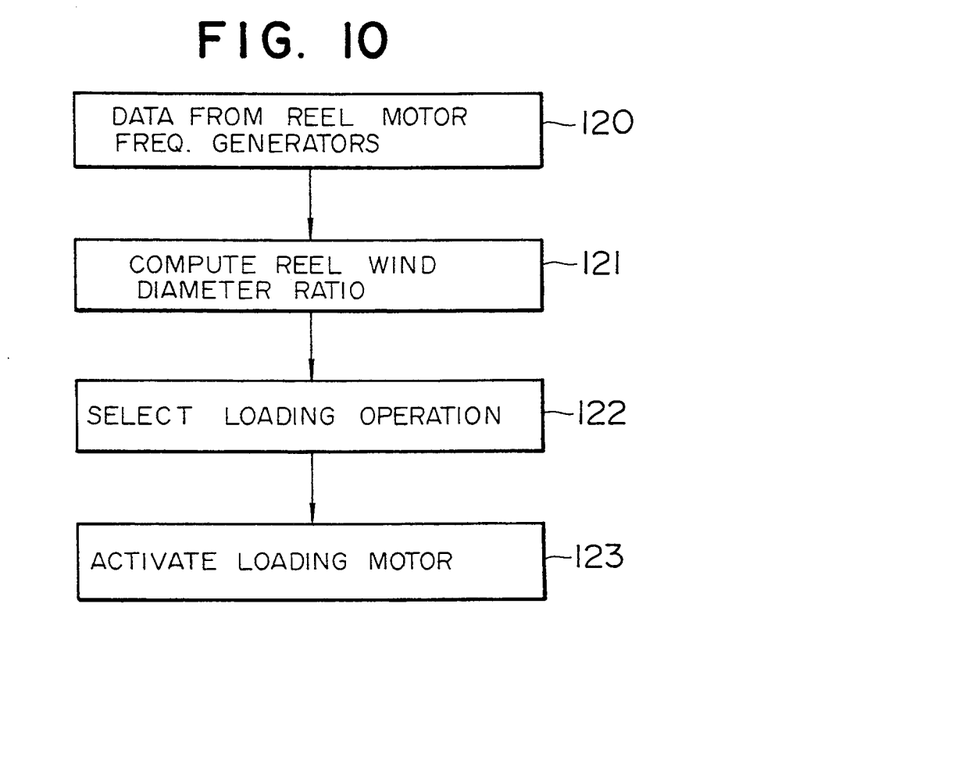
FIG. 10 is an explanatory view schematically showing the flow of operation performed by the tape loading device of the first embodiment.
Figure 11:
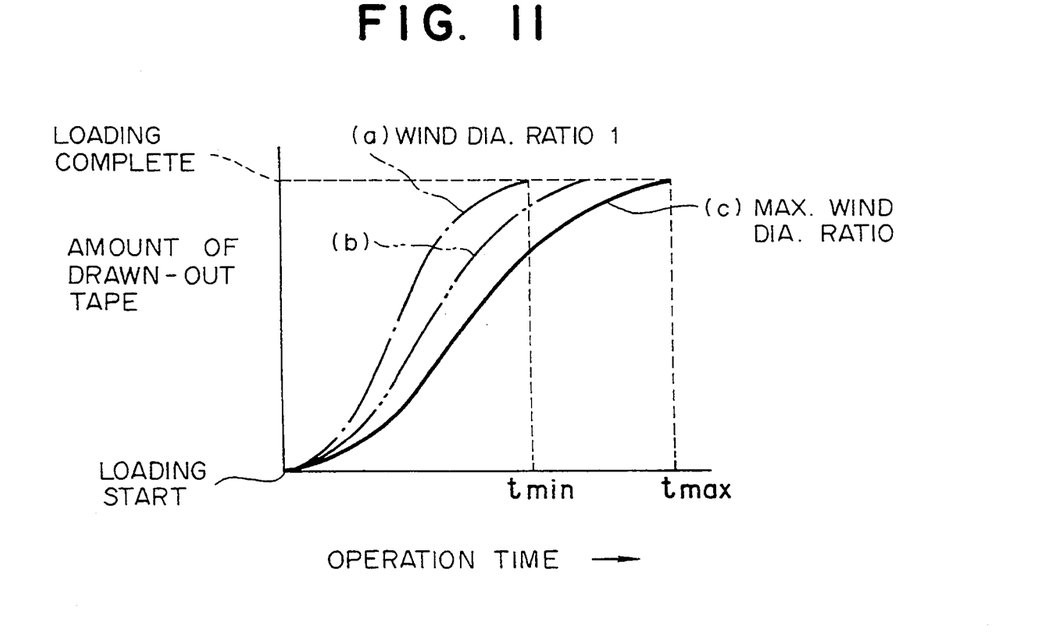
FIG. 11 is a diagram showing an example of the control characteristics employed in the device of the first embodiment.

The operation of the tape loading device according to the embodiment will be described with reference to FIGS. 10 and 11. The cassette 3 is inserted into and loaded on the VTR, so that the cassette reels 4 and 5 are respectively seated on reel bases which are driven by the aforesaid reel driving motors 104 and 105 in a manner known per se. After the loading of the cassette 3, a computation is performed in accordance with the following procedure to determine the ratio between the tape wind diameters on the supply reel 4 and the take-up reel 5, prior to the commencement of the tape loading operation.

After the loading of the cassette, both the reel driving motors 104 and 105 operate for a predetermined time to apply torques of the same level to both the reels 4 and 5 of the cassette 3. If the tape wind diameters on both reels are different, the tape will run towards the reel of the smaller tape wind diameter. In Step 120 of the flow shown in FIG. 10, the data of rotation speeds and rotation directions of the reel driving motors are picked up in the form of the output signals from the frequency generators 108 and 109, and the ratio between the tape wind diameters on both the reels 4, 5 is computed by the aforesaid tape wind diameter ratio computing circuit 110 in Step 121. It is also possible to compute the inertia ratio between both the reels on the basis of the result of the above-described computation. In this case, representing the computed tape winding diameter ratio by $\alpha$, the inertia ratio is calculated by the circuit 110 as being approximately $\alpha^4$, since the inertia of each reel is substantially proportional to the fourth order of the reel radius including the tape on the reel. The result of computation is delivered to the control circuit 100. A plurality of tape loading operation pattern characteristics in relation to time, corresponding to values of the ratio determined as described, are beforehand stored in the control circuit 100. In Step 122, the control circuit 100 selects one out of these operation pattern characteristics in accordance with the result of the computation of the ratio. The operation pattern characteristics are determined such that the loading time is shortest when the tape winding diameter ratio is 1:1 as shown by a characteristic curve (a) in FIG. 11 and is prolonged as the difference in the tape winding diameter becomes greater, as shown by characteristic curves (b) and (c) in the same Figure. The characteristics have been determined by using experiment models, for various values of the tape wind diameter ratio or inertia ratio, so as to most effectively eliminate the influence of the reel inertia, i.e., so as to suppress any excess rotation of the reels due to inertia, thus enabling quickest extraction of the tape. The most appropriate operation pattern characteristic is selected in accordance with the result of the computation. The control operation pattern characteristic for controlling the tape loading operation may be selected on the basis of the aforesaid inertia ratio, instead of relying upon the described tape winding diameter ratio, so that the tape drawing operation is performed in accordance with the selected control operation pattern characteristic. Which one of the tape wind diameter ratio and the inertia ratio is to be used is a matter of discretion.

Thus, in the illustrated embodiment, it is possible to eliminate any slacking or tensioning of the tape due to influence of inertia, even when one reel has larger inertia, by suitably setting the acceleration or deceleration in the tape drawing motion in accordance with the inertia of that reel. After the selection of the optimum tape loading operation pattern according to the computed tape wind diameter ratio, the control circuit 100 operates to activate the loading motor 106 in accordance with the selected pattern, thereby starting the tape loading operation. The phase of the tape loading operation, i.e., the state of the proceeding of the operation in relation to time, is momentarily detected by the potentiometer 103. The control circuit 100, on the basis of the result of the detection, operates to control the power of the loading motor 106 in such a manner that the loading operation be conducted in accordance with the selected operation characteristic pattern. This control operation is executed in Step 123. The tape loading operation is ceased when a signal from the sensor 101 indicative of completion of the loading operation is received by the control circuit 100.

The operation of the device of this embodiment when unloading the tape is substantially the same as that described hereinbefore. When the tape unloading operation is executed after a running of the tape, the tape wind diameter computing circuit 110 computes the values of the diameters of the tapes on both the reels or the values of inertia derived from the tape diameters, on the basis of the output signals from the frequency generators 108 and 109 during running of the tape. Then, the control circuit 100 selects the operation pattern optimum for the result of computation, and conducts the control for the tape unloading operation. In the case where an instruction is given for unloading the tape while the tape has not run, the operation pattern for tape unloading operation is selected on the basis of the values which were computed for the tape loading operation when the cassette was loaded on the VTR.

With the arrangement of the tape loading device shown in FIG. 1, it is possible to compute, in the course of the tape loading operation, the values of actual tape wind diameters and inertia on respective cassette reels, in accordance with the data derived from the potentiometer 103 and the frequency generators associated with the respective reel driving motors 104, 105. It is therefore possible to compute the actual values during the tape loading operation and to use these values in the tape unloading operation as described above. The results of the computation performed during tape loading operation can be corrected or changed as necessary during the tape loading operation.

The tape loading device according to the second embodiment of the invention will be now described with reference to FIGS. 12, 13 and 14. The second embodiment, as will be understood from the following description, can eliminate such phenomenon as any slack of the tape, without requiring any change in the tape loading time.

Figure 12:
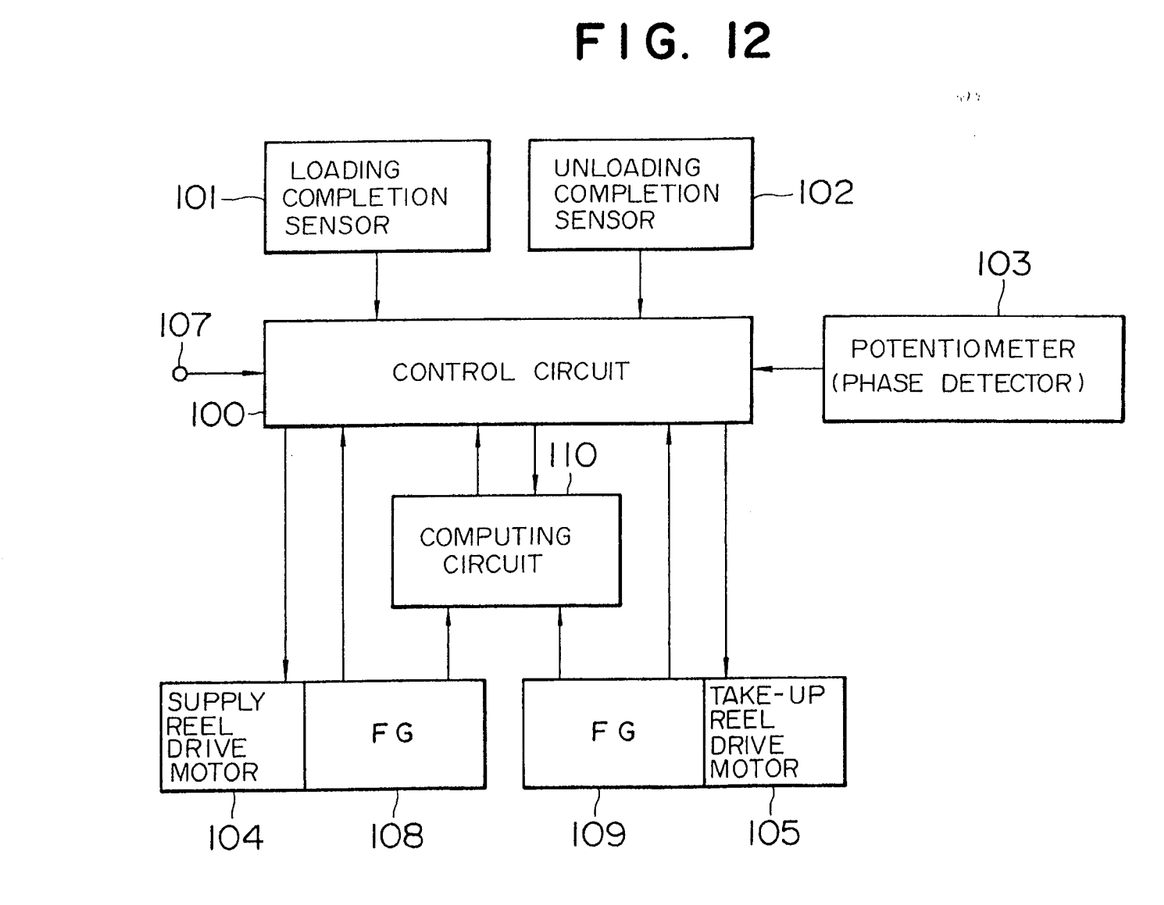
FIG. 12 is a block diagram illustrative of the control system in the tape loading device for a magnetic recording/reproducing apparatus according to a second embodiment of the invention.
Figure 13:
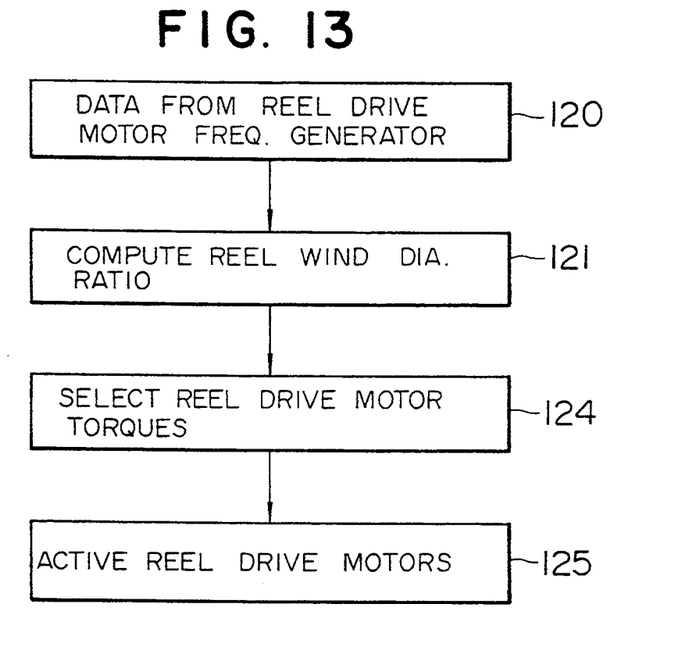
FIG. 13 is an explanatory view schematically showing the flow of operation performed by the device of FIG. 12.

FIG. 12 shows the control system employed in the tape loading device of the second embodiment. In this system, the control circuit 100 controls the driving torques of the reel driving motors 104, 105 during the tape loading operation. More specifically, referring to FIG. 13, the tape wind diameter ratio or the inertia ratio is computed on the basis of the outputs from the frequency generators as described before, in advance of the start of the tape loading operation. This operation is executed in Steps 120 and 121 of the flow shown in FIG. 13. Then, the control circuit 100 operates to select torque control patterns for the respective reel motors in accordance with the computation result, in Step 124, and then vary the output torque values of the reel driving motors in accordance with the selected patterns in Step 125 during the tape loading operation.

Figure 14:
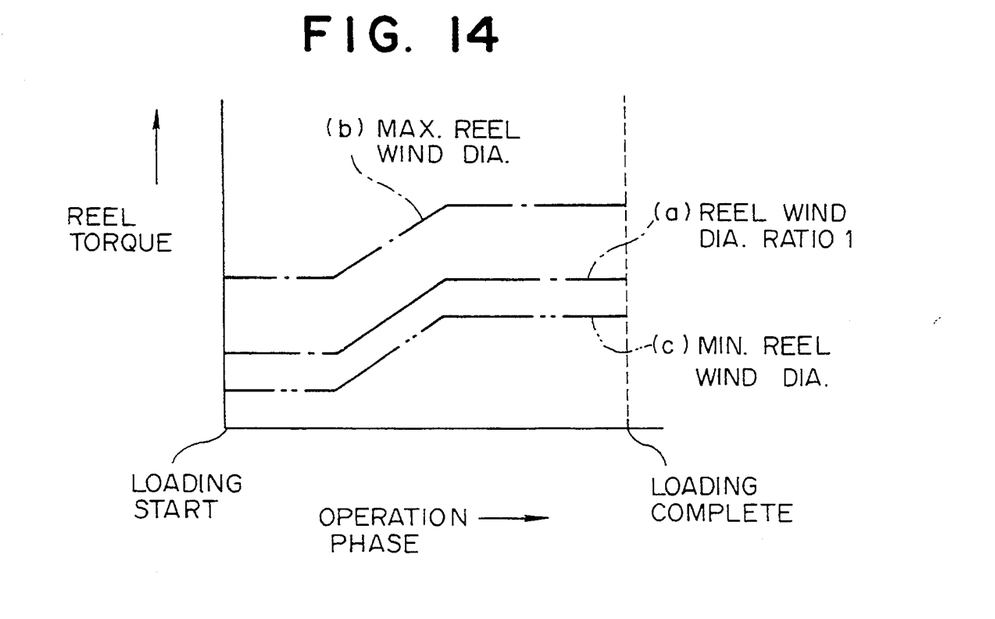
FIG. 14 is a diagram showing an example of the control characteristics employed in the device of FIG. 12.

The control circuit 100 stores a plurality of torque control pattern characteristics in relation to the computed values of the ratio, for instance, as represented by the characteristic curves (a), (b), (c) and (d) in FIG. 14. These characteristics have been determined beforehand in a similar manner to the aforementioned operation pattern characteristics employed in the first embodiment. Thus, in the second embodiment, optimum torque control pattern characteristics are selected in accordance with the result of the computation performed on the basis of the outputs from the frequency generators, and the output torques of the reel driving motors are controlled in accordance with the selected torque control operation pattern.

FIG. 14 shows the torque control characteristic patterns, with the axis of abscissa showing the operational phase of the loading mechanism and the axis of ordinate indicating the reel motor torque. The characteristic curve (a) in FIG. 14 applies to the case where the ratio between the diameters of the tape wound on the reels is 1:1. In this case, the torques produced by the reel motors are equal to each other. The torques to be generated by the reel motors are varied, for instance, as shown by the curve (b) and the curve (c) as the tape wind diameter ratio increases. Thus, undesirable state such as slacking of the tape is avoided during the tape loading operation, as the set torque levels for the respective reel driving motors are varied in accordance with the levels of the inertia. Also in the device of this embodiment, the operational phase of the tape loading mechanism is known through the output from the potentiometer 103, and the control circuit 100 controls the reel motors such that each of them produces a torque of a level corresponding to the operational phase of the tape loading mechanism.

It will be understood that the tape unloading operation can be controlled substantially in the same manner as that described above. The selection of the torque control operation patterns may be done on the basis of computed inertia ratio so that the output torque levels of the respective reel driving motors are controlled in accordance with the thus selected patterns. Whether the tape wind diameter ratio or the inertia ratio is used as the basis for the selection of the control pattern is a discretionary matter.

Further, according to the invention, it is possible to carry out the control in which the control of the operation of the loading motor as adopted in the first embodiment and the control of the reel driving motors as employed in the second embodiment are combined with each other such that the control of acceleration or deceleration in the tape drawing motion and the torques on the reels during the tape loading operation are suitably combined. Such a combination of two types of control makes it possible to reduce the time required for the tape loading as short as possible while keeping the tape tension at a sufficiently low level without being accompanied by slack or excessive tensioning of the tape.

The invention as described can be applied to an apparatus such as a VTR which is designed to handle tape cassettes of different sizes. In such application, different groups of control patterns to be selected are prepared for respective types of cassettes, the type of a cassette loaded in the apparatus is discriminated, and an adequate operation control pattern is selected from the group of control patterns for the loaded cassette in the manner described hereinbefore. Thus, the advantages brought about by the described embodiments can be enjoyed even in such application.

As has been described, according to the invention, the loading motor output and/or the reel driving motor torques are controlled during tape loading or unloading operation, in accordance with the result of computation of the ratio between two cassette reels in tenths of the tape wind diameter or reel inertia. It is therefore possible to minimize the risk of damaging the tape during loading and unloading, by eliminating undesirable effect of factors such as inertia of cassette reels.

What is claimed is:

1. A tape loading device for a magnetic recording/reproducing apparatus in which a tape is drawn out of a cassette and wound around a rotary head drum and recording onto and reproduction from the tape are made through a relative movement between the tape and magnetic heads on the rotary head drum, the tape loading device comprising:

tape guide means for drawing the tape out of the cassette and defining a running path for the tape;
means for driving said tape guide means;
means for driving two reels of the cassette respectively to apply back tension to the tape;
means for detecting directions and speeds of rotation of said two reels and computing at least one of a tape wind diameter ratio and a reel inertia ratio between the reels; and
means for controlling operation of said driving means and said back tension applying means, said control means storing a plurality of control characteristics determined for a plurality of values of the tape wind diameter ratio or the reel inertia ratio between said reels to effectively suppress undue rotations of the reels due to inertia, said control means operating said back tension applying means after loading of the cassette onto the magnetic recording/reproducing apparatus and before loading of the tape onto the rotary head drum to apply the same torque to both the reels, said control means selecting a control characteristic from the stored control characteristics in accordance with a result of computation by said detecting and computing means while the same torque is applied to said reels, and said control means controlling at least one of said driving means and said back tension applying means in accordance with the selected control characteristic when loading and unloading of the tape.

2. The device according to claim 1, further comprising phase detection means for detecting operational phase of said tape guide means, wherein said control means performs control with the characteristics selected according to the operational phase detected by said phase detection means.

3. The device according to claim 2, wherein said control characteristics are patterns indicative of levels of torques to be applied to the respective reels of the cassette in relation to the operational phase of said tape guide means, and said control means activates said back tension applying means in accordance with a selected pattern.

4. The device according to claim 1, wherein said control characteristics are patterns representing different time lengths which are required for said tape guide means to draw the tape by a predetermined amount, and said control means activates said driving means in accordance with a selected pattern.

5. The device according to claim 1, further comprising phase detection means for detecting operational phase of said tape guide means, wherein said control characteristics include patterns representing different time lengths which are required for said tape guide means to draw the tape by a predetermined amount, and patterns indicative of levels of torques to be applied to the respective reels of the cassette in relation to the operational phase of said tape guide means, and said control means activates said driving means and said back tension applying means in accordance with patterns which are selected according to the operational phase detected by said phase detection means.

6. A tape loading device for a magnetic recording/reproducing apparatus in which a tape is drawn out of a cassette and wound around a rotary head drum for recording onto and reproduction from the tape through a relative movement between the tape and magnetic heads on the rotary head drum, the tape loading device comprising:

a plurality of tape guides arranged to define a path for running of the tape;

a tape loading mechanism carrying thereon parts of said tape guides and movable to draw the tape out of and return the tape into the cassette by said tape guides carried on said tape loading mechanism;

a loading motor for driving said tape loading mechanism;

a pair of reel driving motors provided to engage with respective reels of the cassette when the cassette is loaded in the apparatus, and drive the respective reels to thereby apply a back tension to the tape;

phase detection means for detecting operational phase of said tape loading mechanism;

rotation detection means for detecting directions and speeds of rotations of the reels;

computing means for computing, based on the directions and speeds of the reel rotations detected by said rotation detecting means, at least one of a tape wind diameter ratio and an inertia ratio between the reels; and control means for giving driving instructions to said reel driving motors to activate said reel driving motors, said control means storing a plurality of control characteristics for tape loading which are beforehand determined to effectively suppress rotations of the reels due to inertia, for different values of said tape wind diameter ratio and/or said inertia ratio between the reels, said control means being operable to activate said reel driving motors to apply the same torque to the two reels of the cassette after loading of the cassette and before tape loading, said control means being also operable to select a control characteristic out of said plurality of control characteristics according to a result of computation by said computing means while the same torque is applied to the reels and to vary at least one of a driving instruction to said loading motor and the driving instructions to said reel driving motors in accordance with the selected control characteristic.

7. The device according to claim 6, wherein said control characteristics are patterns representing different time lengths which are required for said tape loading mechanism to draw the tape by a predetermined amount, and said control means varies the driving instructions to said loading motor in accordance with the selected pattern.

8. The device according to claim 6, wherein said control characteristics are patterns indicative of levels of torques to be applied to the respective reels of the cassette in relation to the operational phase of said tape loading mechanism, and said control means varies the driving instruction to said reel driving motors in accordance with the selected pattern.

9. The device according to claim 6, wherein said control characteristics include patterns representing different time lengths which are required for said tape loading mechanism to draw the tape by a predetermined amount, and patterns indicative of levels of torques to be applied to the respective reels of the cassette in relation to the operational phase of said tape loading mechanism detected by said phase detecting means, and said control means varies the respective driving instructions to said loading motor and said reel driving motors in accordance with the selected patterns.

* * * * *